(12) United States Patent
LeVey et al.

(10) Patent No.: US 6,540,251 B1
(45) Date of Patent: Apr. 1, 2003

(54) SIDE AIRBAG RETENTION SYSTEM AND FASTENER

(75) Inventors: Kenneth R. LeVey, West Chicago, IL (US); Eric Parker, Elgin, IL (US); Franco Cisternino, Highwood, IL (US); Jeffrey D. Anderson, South Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/595,306

(22) Filed: Jun. 16, 2000

Related U.S. Application Data
(60) Provisional application No. 60/193,524, filed on Mar. 31, 2000.

(51) Int. Cl.⁷ ............................................... B60R 21/16
(52) U.S. Cl. .................................................. 280/728.2
(58) Field of Search .......................... 280/728.2, 743.1, 280/730.2, 730.1; 411/301, 263

(56) References Cited

U.S. PATENT DOCUMENTS

| | | | |
|---|---|---|---|
| 3,392,427 A | | 7/1968 | Lane |
| 3,588,142 A | | 6/1971 | Gorman |
| 4,986,570 A | | 1/1991 | Quinting |
| 5,538,377 A | * | 7/1996 | Stewart et al. ............... 411/174 |
| 5,546,723 A | * | 8/1996 | Jones ........................... 52/698 |
| 5,782,481 A | * | 7/1998 | Magoteaux .............. 280/728.2 |
| 5,785,348 A | * | 7/1998 | Donovan et al. ........... 280/740 |
| 6,170,858 B1 | * | 1/2001 | Turner .......................... 180/13 |
| 6,250,665 B1 | * | 6/2001 | Sutherland et al. ...... 280/728.2 |

FOREIGN PATENT DOCUMENTS

| | | |
|---|---|---|
| DE | 44 01 861 A1 | 7/1995 |
| GB | 1216657 | 12/1970 |
| GB | 1347678 | 2/1974 |

* cited by examiner

Primary Examiner—Paul N. Dickson
Assistant Examiner—Faye M. Fleming
(74) Attorney, Agent, or Firm—Mark W. Croll; Paul F. Donovan

(57) ABSTRACT

A side airbag retention system for installation in a keyhole opening including a bolt with a generally conical head portion and a shaft disposed through an aperture of the air bag retainer, and a bolt retainer disposed about the bolt shaft between the bolt head and the air bag retainer. The bolt retainer preferably includes a spring washer having a pronged engagement member extending generally radially therefrom between anti-rotation tabs extending from a side thereof opposite the bolt head, and a compression limiting member disposed about and protruding from the washer opening toward the bolt head.

29 Claims, 2 Drawing Sheets

SIDE AIRBAG RETENTION SYSTEM AND FASTENER

This application claims the benefit of Provisional Application No. 60/193,524, filed Mar. 31, 2000.

BACKGROUND OF THE INVENTION

The invention relates generally to fastener retainers, and more particularly to side air bag retention systems and fasteners therefor.

Bolt retainers for retaining bolts, for example in keyhole openings, are known generally.

An object of the present invention is to provide novel retention systems and fasteners therefor that improve upon and overcome problems in the art.

Another object of the invention is to provide novel retention systems and fasteners therefor that are economical and reliable.

Another object of the invention is to provide novel side airbag retention systems and fasteners therefor that are more securely fastenable to keyhole openings.

A further object of the invention is to provide novel side airbag retention systems and fasteners therefor that may be installed blindly.

Another object of the invention is to provide novel side airbag retention systems and fasteners therefor that provide an audible indication upon installation.

Another object of the invention is to provide novel side airbag retention systems and fasteners therefor that limit compression.

A further object of the invention is to provide novel side airbag retention systems and fasteners therefor that do not rattle when installed.

Another object of the invention is to provide novel side airbag retention systems and fasteners therefor that are re-useable, for example after deployment of the airbag.

Yet another object of the invention is to provide novel side airbag retention systems and fasteners therefor that maintain rotation alignment during assembly and installation.

Still another object of the invention is to provide novel side airbag retention systems and fasteners therefor that provide a continuous mounting force.

A more particular object of the invention is to provide novel side airbag retention systems comprising an air bag retainer, a bolt having a generally conical head portion and a shaft disposed through an aperture of the air bag retainer, and a bolt retainer disposed about the bolt shaft between the bolt head and the air bag retainer.

Another more particular object of the invention is to provide novel retention systems comprising a bolt having a head and a shaft fastened to an article, a spring washer disposed about the bolt shaft between the bolt head and the article, an annular member disposed about an opening of the spring washer and protruding from a side thereof facing the bolt head, an engagement member extending from the spring washer generally radially therefrom, and a prong protruding from a side of the engagement member facing the bolt, the prong extending generally away from the bolt shaft.

Yet another more particular object of the invention is to provide novel keyhole retention assemblies comprising a bolt having a shaft and a generally conical head, a spring washer disposed about the bolt shaft, an engagement member extending from the spring washer generally radially therefrom, and a prong protruding from a side of the engagement member facing the bolt head, the prong extending away from the shaft.

Still another more particular object of the invention is to provide novel article retention assemblies for installation in keyhole openings comprising a bolt with a generally conical head portion and a shaft disposed through an aperture of the article and coupled thereto, a spring washer disposed about the bolt shaft between the head and the air bag retainer, a pronged engagement member extending generally radially from the spring washer between anti-rotation tabs extending from a side thereof opposite the head, and a compression limiting member disposed about and protruding from the spring washer opening toward the bolt head.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
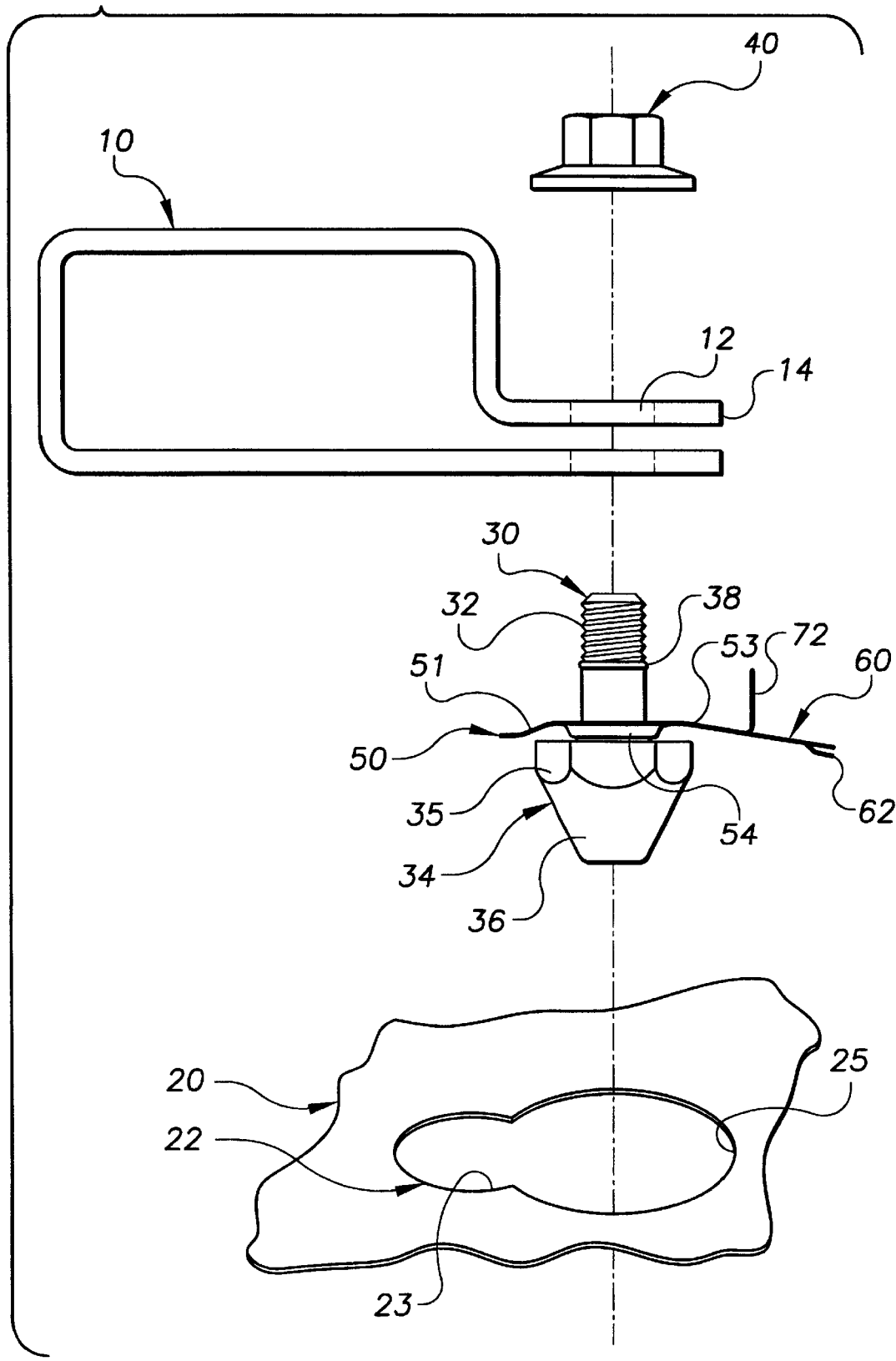
FIG. 1 is an exemplary side airbag retention system for installation in a keyhole opening.

FIG. 1 illustrates a bolt retention assembly for fastening an article to a panel 20 having a keyhole 22 with relatively small and large opening portions 23 and 25, respectively.

In the exemplary application, the article is a side airbag retainer 10 having an aperture 12 through one or more portions thereof, and the panel 20 is an interior roof portion near the A and B pillars of an automobile.

In FIG. 1, the bolt retention assembly comprises a bolt having a shaft 30 preferably having a threaded portion 32 and a head 34. The bolt is disposable through the aperture 12 of the airbag retainer 10 and is generally coupled thereto, for example by a nut 40 or by threaded engagement with a threaded portion of the aperture 12. The exemplary bolt head includes a wrenching surface 35, but other embodiments may include some other torque transmitting configuration.

The exemplary bolt head also includes a generally conical head portion 36 having a relatively narrow end portion protruding axially therefrom. The conical head portion facilitates insertion thereof into the keyhole or other opening, and is particularly desirable in applications where installation is performed blindly. In the exemplary side airbag application, for example, the airbag retainer is installed on the interior roof of the passenger compartment from outside the vehicle, where the keyhole is not readily visible to the installer.

The bolt retention assembly also comprises a bolt retainer for retaining the assembly in the keyhole or opening. The exemplary bolt retainer generally comprises a spring washer 50 disposed about the bolt shaft, and an engagement member 60 extending from the spring washer generally radially, and preferably beyond or outwardly of the bolt head.

The spring washer 50 generally comprises one or more resilient portions biased toward the bolt head for applying an axial retention force thereto. In FIG. 1, the exemplary spring washer has resilient portions 51 and 53 curved toward the bolt head on opposite sides of the washer opening. In other embodiments, the spring washer may have a radial or other wave form.

In FIG. 1, the engagement member preferably includes a prong 62 protruding from a side thereof facing the bolt head. The prong 62 extends generally away from the bolt shaft. In the exemplary embodiment of FIG. 2, the prong 62 is formed, for example in a stamping operation, at or on an end portion of the engagement member 60 between opposite lateral side portions 64 and 65 thereof.

In FIG. 1, the prong 62 is preferably disposed on a portion of the engagement member extending outwardly beyond the head portion of the bolt. The prong 62 is also preferably spaced from the opening of the spring washer so that the prong is engageable with an edge of the larger keyhole opening portion 25 after the bolt is laterally positioned therefrom to the smaller keyhole opening portion 23, as illustrated best in FIG. 2.

The engagement member 60 is preferably resilient and is biased toward the bolt head 34. During installation of the bolt retention assembly with the airbag retainer or other article, the engagement member provides an audible sound indicating that the prong is engaged with the opening and that installation is complete.

Figure 2:
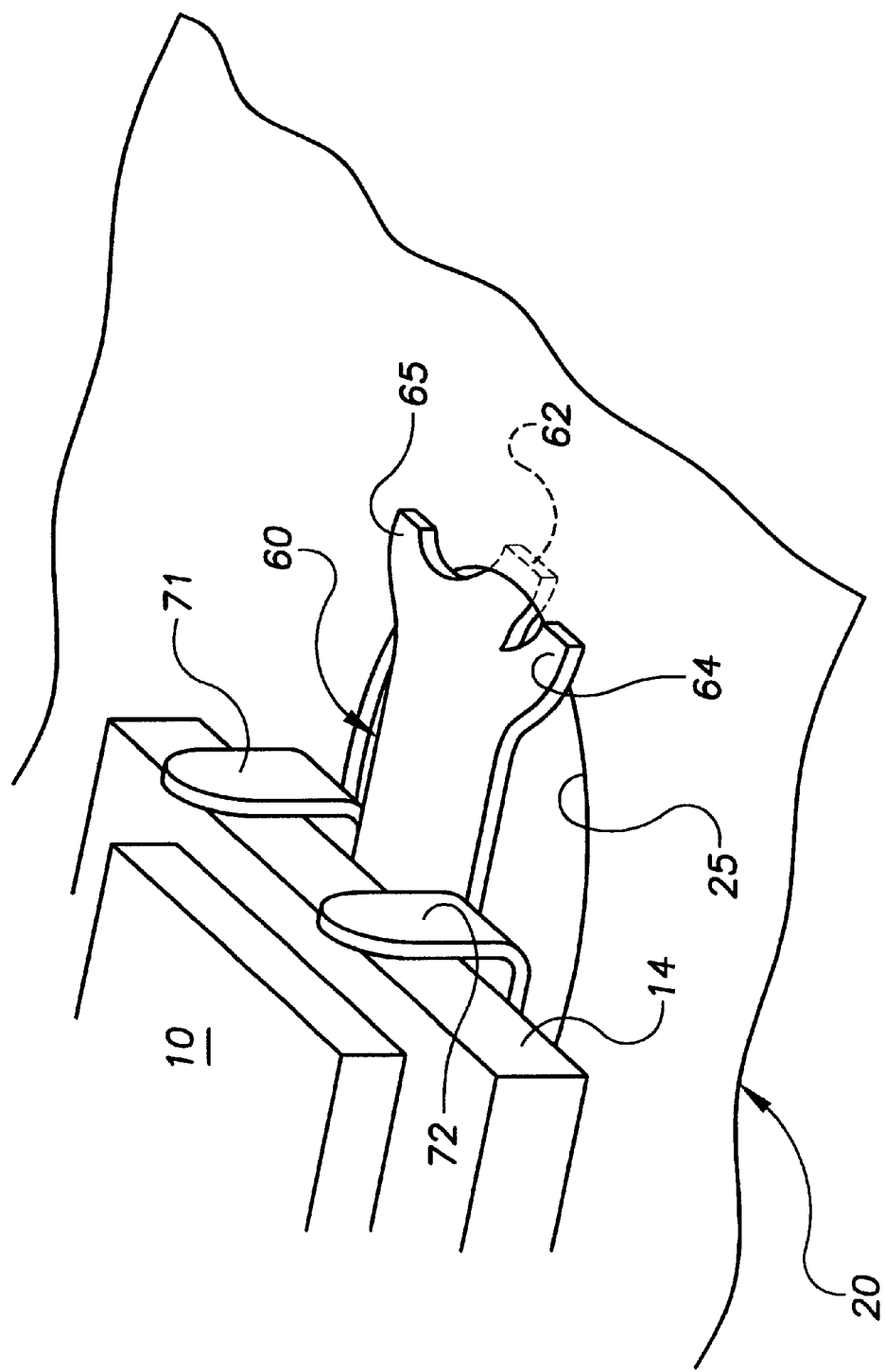
FIG. 2 is a partial view of an assembled and installed side airbag retention system.

In FIG. 2, the prong 62 preferably protrudes sufficiently far from the side of the engagement member 60 facing the bolt head to permit capturing the panel 20 between the prong 62 and the lateral side portions 64 and 65 of the engagement member 60.

In FIG. 1, the spring washer 50 preferably includes an annular member or portion 54, which may be a continuous member or comprised of discrete portions, disposed about the washer opening and protruding from the side thereof facing the bolt head. Upon assembly, the annular member 54 seats against the bolt head and limits compression of the spring washer between the bolt head and panel during tightening of the nut or other bolt engagement means.

The bolt retainer preferably includes an anti-rotation member for preventing rotation thereof during assembly with the article or exemplary airbag retainer 10. In FIG. 1, the aperture 12 of the airbag retainer 10 is near an end portion 14 thereof, and the anti-rotation member comprises two tabs (only tab 72 is visible in FIG. 1) extending from the side of the retainer opposite the bolt head.

In FIG. 2, the tabs 71 and 72 are disposed on opposite sides of the engagement member 60 extending from the end of the spring washer. Upon installation of the bolt retention assembly with the article or airbag retainer 10, the two tabs 71 and 72 are adjacent and engageable with the end portion 14 thereof to prevent rotation of the washer.

In FIG. 1, a generally annular protuberance 38 is disposed about the bolt shaft to capture the spring washer 50 between the bolt head 34 and the protuberance 38.

The exemplary bolt retainer is preferably a unitary member, for example spring steel formed in a stamping or other forming operation, but may be formed as an assembly in other embodiments.

Alternative embodiments of the invention may include other known bolt retainers.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A side airbag retention system for use in conjunction with a panel member having a first side, a second side, and a hole therethrough, the system comprising:
   an air bag retainer having an aperture;
   a bolt having a shaft and a conical head portion, the bolt shaft disposed through the aperture of the air bag retainer; and
   a bolt retainer disposed about the bolt shaft between the bolt head and the air bag retainer, such that the air bag retainer is secured to the panel member by passing the bolt head through the opening in the panel member so that the bolt head is positioned on the first side of the panel member and the bolt retainer is positioned on the second side of the panel member.

2. The system of claim 1, the bolt retainer comprising a spring washer portion having an opening and an engagement member extending from an end thereof, the engagement member having a prong protruding from a side thereof facing the bolt head portion, the prong extending away from the opening of the spring washer portion.

3. The system of claim 2, the spring washer portion having an annular member disposed about the opening thereof, the annular member protruding from a side of the spring washer portion facing the head portion of the bolt, the bolt coupled to the airbag retainer by a nut.

4. The system of claim 2, the spring washer portion having resilient portions biased toward the bolt head portion, the prong disposed on a portion of the engagement member extending generally radially beyond the bolt head portion.

5. The system of claim 2, the bolt retainer having an anti-rotation member extending therefrom toward the airbag retainer.

6. The system of claim 5, the aperture of the airbag retainer near an end portion thereof, the anti-rotation member comprising two tabs extending from a side of the spring washer portion facing the airbag retainer, the two tabs adjacent the end portion of the airbag retainer, the engagement member extending from the end of the spring washer portion between the two tabs.

7. A retention system comprising:
   an article;
   a bolt having a head and a shaft fastened to the article;
   a spring washer disposed about the bolt shaft between the bolt head and the article;
   an annular member disposed about the opening of the spring washer and protruding from a side thereof facing the bolt head, the annular member being adapted to seat against the head of the bolt to limit compression of the spring washer between the head of the bolt and the article;
   an engagement member extending from the spring washer generally radially therefrom; and
   a prong protruding from a side of the engagement member facing the bolt, the prong extending generally away from the bolt shaft.

8. The system of claim 7, the spring washer having a resilient portion biased toward the head portion of the bolt.

9. The system of claim 7, the spring washer having an anti-rotation member extending therefrom toward the article.

10. The system of claim 9, the article having an aperture near an end portion thereof, the anti-rotation member comprising two tabs extending from a side of the spring washer facing the article, the two tabs adjacent the end portion of the article.

11. The system of claim 7, the bolt having a wrenching surface and a generally conical head portion protruding axially therefrom.

12. The system of claim 7 further comprising a panel with an opening between first and second opposite sides thereof, the panel captured between the prong on one side of the panel and a portion of the engagement member on an opposite side thereof.

13. The system of claim 7,
the bolt head having a generally conical head portion,
the spring washer having a resilient portion biased toward the head portion of the bolt,
the prong disposed on a portion of the engagement member extending beyond the head portion of the bolt, the engagement member biased toward the bolt head,
two tabs extending from a side of the spring washer facing the article, the two tabs adjacent and engageable with the article.

14. The system of claim 7, the spring washer and engagement member constitute a unitary metal member.

15. A keyhole retention assembly comprising:
a bolt having a shaft and a generally conical head;
a spring washer disposed about the bolt shaft;
a protuberance disposed about the bolt shaft, the spring washer being captured between the bolt head and the protuberance;
an engagement member extending from the spring washer generally radially therefrom; and
a prong protruding from a side of the engagement member facing the bolt head, the prong extending away from the bolt shaft.

16. The assembly of claim 15, an annular member disposed about an opening of the spring washer, the annular member protruding from a side of the spring washer facing the bolt head.

17. The assembly of claim 15, the spring washer having a resilient portion biased toward the bolt head.

18. The assembly of claim 15, two tabs extending from a side of the spring washer opposite the bolt head, the engagement member extending between the two tabs.

19. The assembly of claim 18, an annular member disposed about an opening of the spring washer, the annular member protruding from a side of the spring washer facing the bolt head.

20. An airbag retention assembly comprising:
a panel member having a front side, a back side, and a keyhole that includes a first opening and a second opening which is generally smaller than the first opening;
an airbag retainer for holding an airbag until deployment of the airbag, the airbag retainer having a first portion for substantially surrounding the airbag, a second portion defined by a pair of generally parallel arm members extending outward from the first portion, and an aperture extending through the arm members;
a bolt member having a head and a shaft which is disposed through the aperture extending through the arm members of the retainer; and
a bolt retainer disposed about the bolt shaft between the bolt head and the airbag retainer, the bolt retainer having an opening for receiving the bolt shaft, and a protruding engagement member, such that the airbag retainer is secured to the panel member by passing the bolt head through the first opening of the panel member so that the bolt head is positioned on the front side of the panel member and the bolt retainer is positioned on the back side of the panel member, and laterally moving the bolt member from the first opening of the panel member to the second opening of the panel member, the second opening of the panel member being appropriately sized so that the bolt head, once positioned therein, cannot be moved through the panel member, and the bolt member being moved into the second opening of the panel member until the engagement member of the bolt retainer engages the front side of the panel member, thereby securely attaching the airbag retainer of the panel member.

21. The airbag retention assembly of claim 20, wherein the bolt head has a generally conical shape so that the bolt head is more easily received by the panel member.

22. The airbag retention assembly of claim 20, wherein the retention assembly further includes a nut threadably received by the bolt member so as to provide a clamp load to the airbag retainer to selectively hold the airbag within the airbag retainer.

23. The airbag retention assembly of claim 20, wherein the bolt retainer includes a springwasher which defines the bolt retainer opening, the spring washer including a first resilient portion and a second resilient portion both of which are curved toward the bolt head and positioned on opposite sides of the bolt retainer opening, the spring washer being adapted to provide an axial retention force toward the bolt head.

24. The airbag retention assembly of claim 20, wherein the engagement member of the bolt retainer includes a prong formed on an end portion and between a pair of opposite lateral side portions thereof, such that when the airbag retainer is securely attached to the panel member, the prong of the engagement member of the bolt retainer engages one of the front side and the back side of the panel member and the lateral side portions of the engagement member of the panel member engages the other of the front side and the back side of the panel member.

25. The airbag retention assembly of claim 20, wherein the engagement member of the bolt retainer is a resilient member and is biased toward the bolt head, such that during attachment of the airbag retainer to the panel member, the engagement member is adapted to provide an audible sound indicating that the airbag retainer has been securely attached to the panel member.

26. The airbag retention assembly of claim 20, wherein the bolt retainer includes an annular member which surrounds the bolt retainer opening, such that the annular member seats against the bolt head to limit the compression of the bolt retainer between the bolt head and the panel member.

27. The airbag retention assembly of claim 20, wherein the bolt retainer includes an antirotation device that prevents the rotation of the bolt retainer relative to the airbag retainer.

28. The airbag retention assembly of claim 27, wherein the anti-rotation device includes a pair of tabs extending from a side of the bolt retainer opposite the bolt head, the tabs being adapted to contact the airbag retainer for preventing the rotation of the bolt retainer relative to the airbag retainer.

29. The airbag retention assembly of claim 20, wherein the bolt member includes a generally annular protuberance disposed about the bolt shaft to capture the bolt retainer between the bolt head and the protuberance.

* * * * *